(12) United States Patent
Yokoo

(10) Patent No.: US 8,483,547 B2
(45) Date of Patent: Jul. 9, 2013

(54) INFORMATION PROCESSING APPARATUS, RECORDING METHOD, AND RECORDING SYSTEM

(75) Inventor: Naohiro Yokoo, Kanagawa (JP)

(73) Assignee: Sony Corporation (JP)

( * ) Notice: Subject to any disclaimer, the term of this patent is extended or adjusted under 35 U.S.C. 154(b) by 343 days.

(21) Appl. No.: 12/802,540

(22) Filed: Jun. 9, 2010

(65) Prior Publication Data

US 2011/0019970 A1     Jan. 27, 2011

(30) Foreign Application Priority Data

Jul. 21, 2009    (JP) ................................ P2009-170237

(51) Int. Cl.
     *H04N 9/80*       (2006.01)
     *H04N 7/10*       (2006.01)

(52) U.S. Cl.
USPC ........... 386/249; 386/239; 386/248; 386/250; 386/251; 386/262; 725/32; 725/34; 725/35; 725/36

(58) Field of Classification Search
USPC .... 386/239, 248, 249, 250, 251, 262; 725/32, 725/34, 35, 36
See application file for complete search history.

(56) References Cited

U.S. PATENT DOCUMENTS

| | | | |
|---|---|---|---|
| 6,345,122 B1 * | 2/2002 | Yamato et al. ................ | 382/232 |
| 6,760,916 B2 * | 7/2004 | Holtz et al. ..................... | 725/34 |
| 7,424,204 B2 * | 9/2008 | Nakamura ..................... | 386/248 |
| 2005/0196137 A1 * | 9/2005 | Blackketter et al. ........... | 386/46 |
| 2005/0259951 A1 | 11/2005 | Sugahara | |
| 2009/0063279 A1 * | 3/2009 | Ives et al. ........................ | 705/14 |

FOREIGN PATENT DOCUMENTS

JP       2005-316147 A     11/2005

\* cited by examiner

*Primary Examiner* — Daquan Zhao
(74) *Attorney, Agent, or Firm* — Lerner, David, Littenberg, Krumholz & Mentlik, LLP

(57) ABSTRACT

An information processing apparatus includes a recording section configured to record a personal content created by an individual on a predetermined recording medium, a meta data generating section configured to generate meta data for the personal content by analyzing details of the personal content, an advertisement content obtaining section configured to obtain an advertisement content corresponding to the meta data from a predetermined advertisement content providing server, and a controller configured to control the personal content and the advertisement content to be recorded on the recording medium via the recording section.

10 Claims, 12 Drawing Sheets

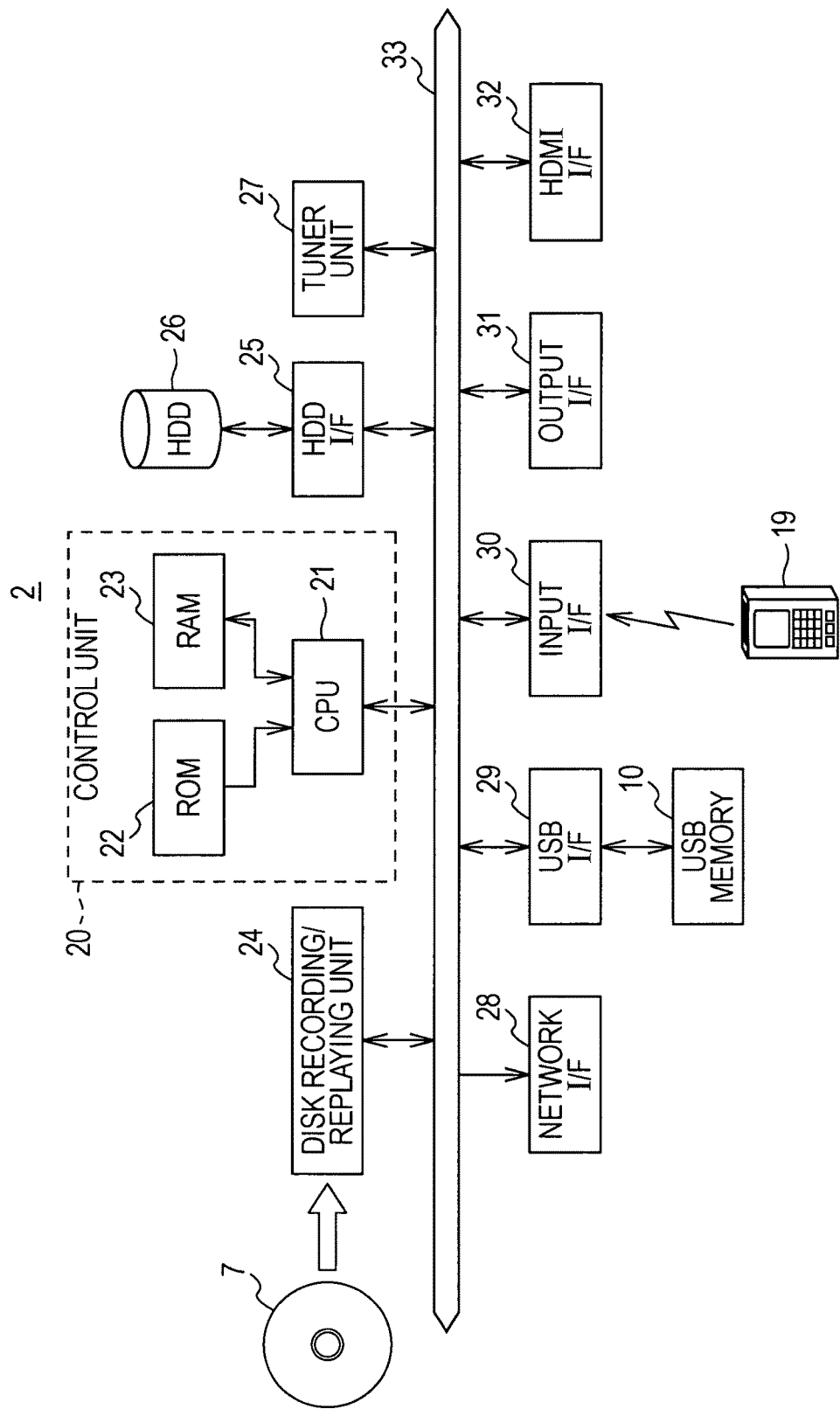

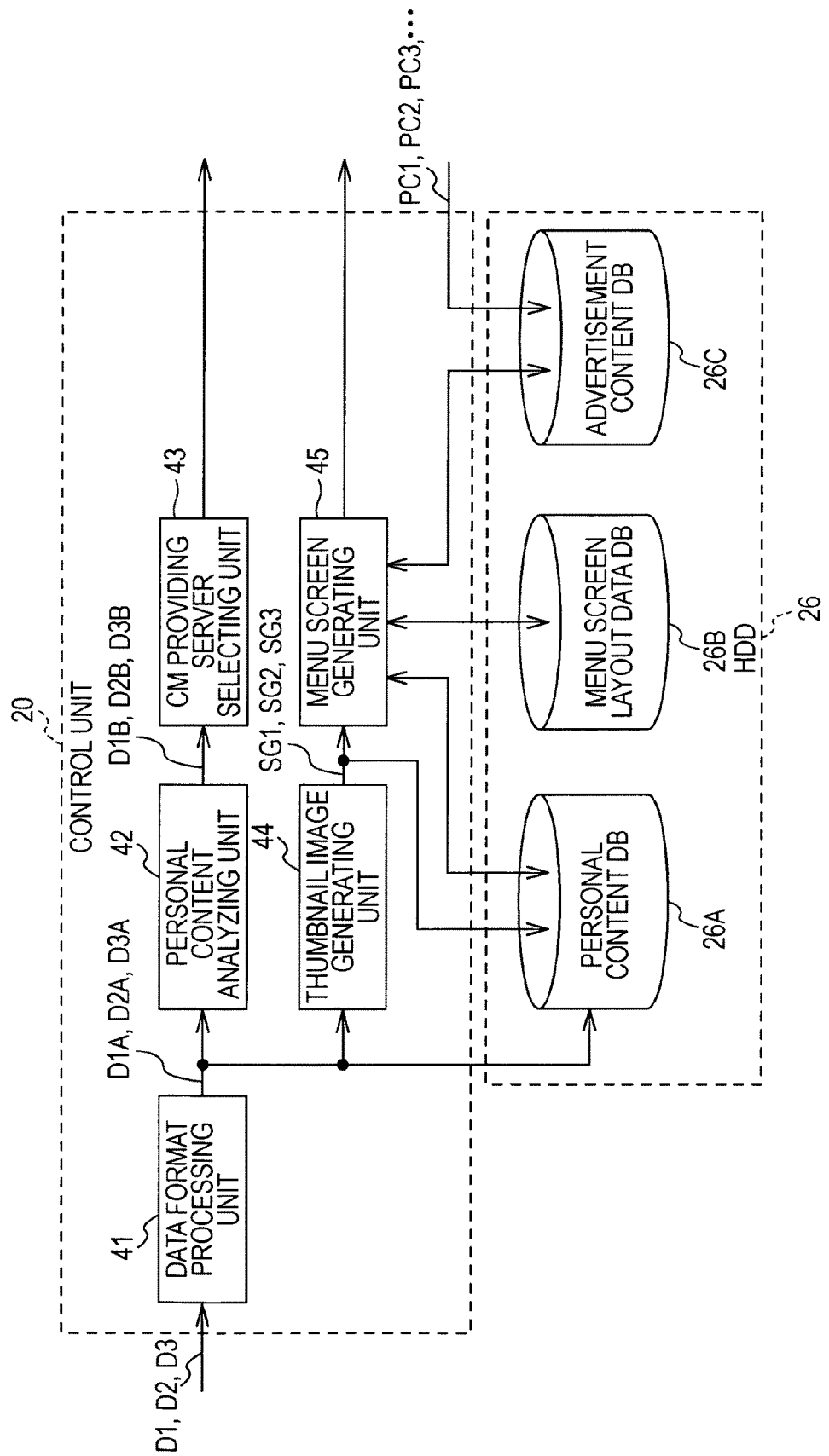

INFORMATION PROCESSING APPARATUS, RECORDING METHOD, AND RECORDING SYSTEM

CROSS-REFERENCE TO RELATED APPLICATION

The present application claims priority from Japanese Patent Application No. JP 2009-170237 filed in the Japanese Patent Office on Jul. 21, 2009, the entire content of which is incorporated herein by reference.

BACKGROUND OF THE INVENTION

1. Field of the Invention

The present invention relates to an information processing apparatus, recording method, and recording system, and is suitable for application to, for example, a Blu-ray disc recorder.

2. Description of the Related Art

In related art, an advertisement posting support system has been suggested in which an image indicating details of an advertisement is printed on the surface of a digital versatile disc (DVD) so that the DVD can be used as an advertisement medium (for example, refer to Japanese Unexamined Patent Application Publication No. 2005-316147).

SUMMARY OF THE INVENTION

In the advertisement posting support system described in Japanese Unexamined Patent Application Publication No. 2005-316147, the only thing the system can do is to print an image indicating the details of an advertisement on the surface of a DVD recording medium, and the size and number of images to be printed are disadvantageously restricted owing to the area of the DVD.

Also in the advertisement posting support system described in Japanese Unexamined Patent Application Publication No. 2005-316147, video contents recorded on a recording medium and an image indicating the details of the advertisement have no relation. Therefore, the details of the advertisement may not interest users, with insufficient advertising effectiveness.

It is desirable to provide an information processing apparatus, recording method, and recording system capable of easily recording an advertisement content that may interest users on a predetermined recording medium.

An information processing apparatus according to an embodiment of the present invention includes a recording means for recording a personal content created by an individual on a predetermined recording medium, a meta data generating means for generating meta data for the personal content by analyzing details of the personal content, an advertisement content obtaining means for obtaining an advertisement content corresponding to the meta data from a predetermined advertisement content providing server, and a control means for causing the personal content and the advertisement content to be recorded on the recording medium via the recording means. With this, the advertisement content matching the details of the personal content can be automatically obtained, and both of the personal content and the advertisement content can be recorded on the recording medium.

A recording method according to another embodiment of the present invention includes the steps of generating meta data for a personal content created by an individual, the personal content to be recorded on a predetermined recording medium, by analyzing details of the personal content by a meta data generating means, obtaining by an advertisement content obtaining means an advertisement content corresponding to the meta data from a predetermined advertisement content providing server, and causing by a control means the personal content and the advertisement content to be recorded on the recording medium via a predetermined recording means. With this, the advertisement content matching the details of the personal content can be automatically obtained, and both of the personal content and the advertisement content can be recorded on the recording medium.

A recording system according to still another embodiment of the present invention includes an information processing apparatus and an advertisement content providing server, the information processing apparatus including a recording means for recording a personal content created by an individual on a predetermined recording medium, a meta data generating means for generating meta data for the personal content by analyzing details of the personal content, an advertisement content obtaining means for obtaining an advertisement content corresponding to the meta data from a predetermined advertisement content providing server, and a recording control means for causing the personal content and the advertisement content to be recorded on the recording medium via the recording means, and the advertisement content providing server including an advertisement content storage means for having a plurality of the advertisement contents stored, an advertisement content searching means for receiving the meta data, searching for the advertisement content corresponding to the meta data, and reading the advertisement content from the advertisement content storage means, and a transmitting means for transmitting the advertisement content to the information processing apparatus. With this, the advertisement content matching the details of the personal content can be automatically obtained, and both of the personal content and the advertisement content can be recorded on the recording medium.

According to the embodiments of the present invention, an information processing apparatus, recording method, and recording system can be provided, which can automatically obtain an advertisement content matching details of a personal content and record both of the personal content and the advertisement content on a recording medium, and thereby can easily record on a predetermined recording medium an advertisement content that may interest a user.

BRIEF DESCRIPTION OF THE DRAWINGS

FIG. 2 is a schematic block diagram showing the circuit structure of a BD recorder;

FIG. 3 is a schematic block diagram showing the functional block structure of a control unit;

DESCRIPTION OF THE PREFERRED EMBODIMENTS

Embodiments of the present invention are described below in the following order.
1. Embodiment
2. Another Embodiment

1. Embodiment

1-1. Entire Structure of Advertisement Content Recording System

Figure 1:
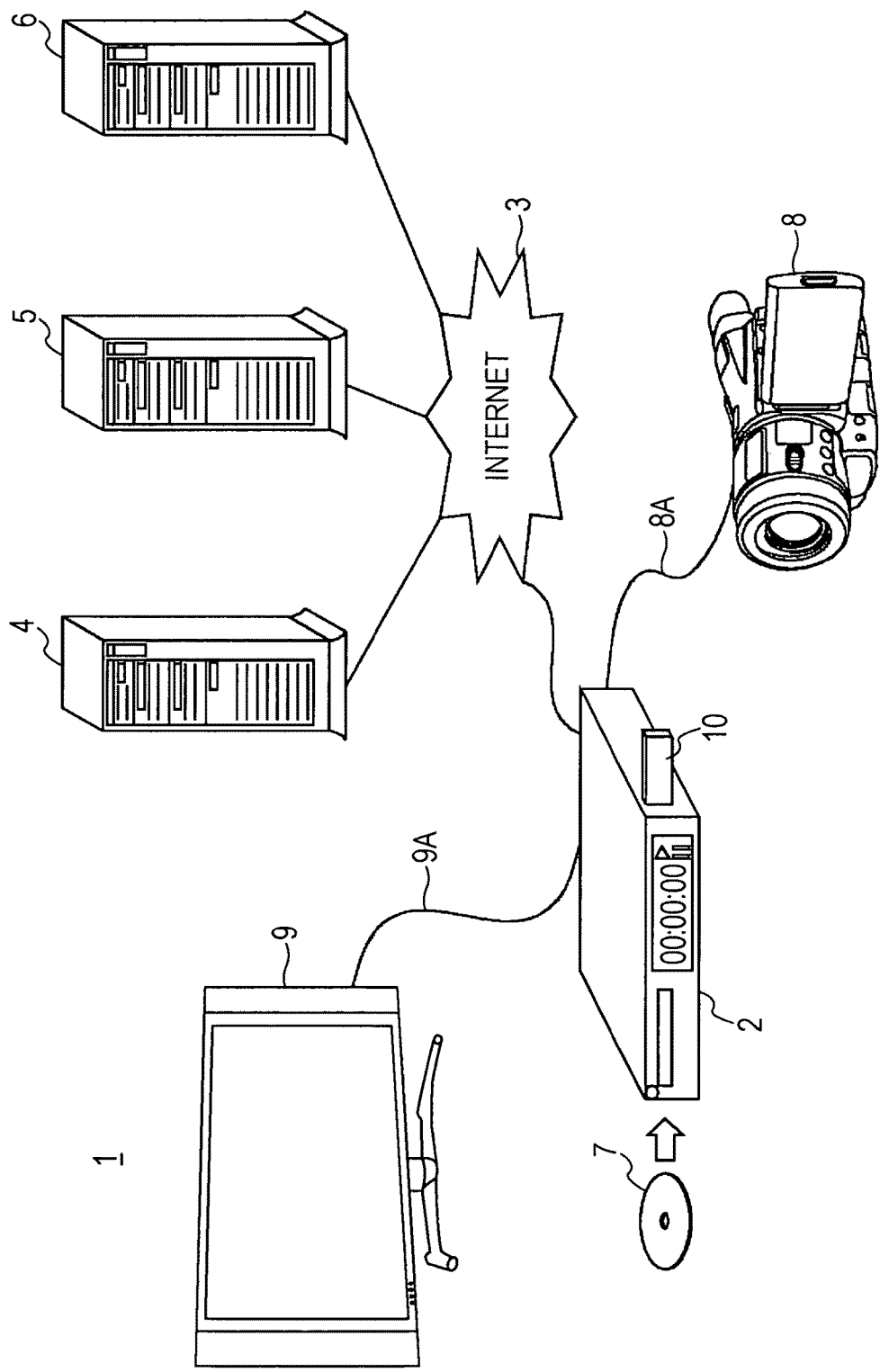
FIG. 1 is a schematic perspective view of the entire structure of a recording system according to an embodiment.

In FIG. 1, 1 denotes the entire structure of a recording system according to an embodiment of the present invention. The recording system includes a Blu-ray disc recorder (referred to below as a BD recorder) 2 as an information processing apparatus and a commercial message (CM) providing servers 4, 5, and 6, as an advertisement content providing server, connected to the BD recorder 2 via the Internet 3.

For example, when a digital video camera 8 is connected via a high definition multimedia interface (HDMI) cable 8A, the BD recorder 2 is configured to be able to capture a user's personal content shot by the digital video camera 8 and write the personal content in a built-in hard disk drive.

The BD recorder 2 is also configured to be able to have, for example, a Blu-ray disc or a digital versatile disc (DVD), as a disk-shaped recording medium 7 inserted and record a personal content captured from the digital video camera 8 and stored in the hard disk drive on the disk-shaped recording medium 7.

When the digital video camera 8 is connected, the BD recorder 2 is also configured to be able to capture a personal content shot by the digital video camera 8 and directly record the personal content without alteration on the disk-shaped recording medium 7.

Furthermore, for example, the BD recorder 2 is connected to a television set 9 via an HDMI cable 9A, and is configured to be able to read a personal content stored in the built-in hard disk drive or recorded on the disk-shaped recording medium 7 for output to the television set 9, thereby causing a replayed video of the personal content to be displayed.

The BD recorder 2 is configured to be able to have a removable external storage section, such as a universal serial bus (USB) memory 10, inserted and, for example, temporarily store the latest advertisement content downloaded from any of the CM providing servers 4, 5, and 6 in the USB memory 10, and replay the stored advertisement content at a desired timing.

The external storage section is not restricted to the USB memory 10. For example, a memory card having a storage capacity of at least 1 gigabyte, a removable hard disk drive, and other various external storage sections may be used.

1-2. Circuit Structure of the BD Recorder

As depicted in FIG. 2, a control unit 20 connected to a system bus 33 in the BD recorder 2 includes a central processing unit (CPU) 21, a read only memory (ROM) 22, and a random access memory (RAM) 23.

The CPU 21 of the control unit 20 is configured to perform basic processes as the BD recorder 2 and other processes according to a basic program and various application programs read from the ROM 22 and launched onto the RAM 23.

For example, upon receiving from a remote controller via an input interface 30 an HDD write instruction for writing a TV program, the CPU 21 of the control unit 20 causes a tuner unit 27 to demodulate, descramble, and decode digital satellite broadcast waves, and records the resultant video data on a hard disk drive 26 via a hard disk interface 25.

Similarly, upon receiving via the remote controller 19 an HDD read instruction for reading a program video, the CPU 21 of the control unit 20 reads video data of a TV program recorded in the hard disk drive 26 via the hard disk interface 25, and outputs the video data from an output interface 31 to the television set 9 (FIG. 1).

When the instruction received from the remote controller 19 via the input interface 30 is a record instruction or replay instruction for the disk-shaped recording medium 7, the CPU 21 of the control unit 20 writes data on or reads data from the disk-shaped recording medium 7 via a disk recording/replaying unit 24.

Furthermore, the CPU 21 of the control unit 20 captures a personal content from the digital video camera 8 (FIG. 1) via an HDMI interface 32 to record the personal content in the hard disk drive 26 via the hard disk interface 25 or cause the disk recording/replaying unit 24 to write the personal content on the disk-shaped recording medium 7.

Here, when a Blu-ray disc including a so-called BD-JAVA® application (referred to below as a BD-J application) is used as the disk-shaped recording medium 7, the CPU 21 of the control unit 20 is configured to be able to achieve an interactive BD-Live function, such as downloading of an additional content by using the BD-J application.

The BD-J application is an application program described in a Java® language, allows a connection to the Internet 3, and allows the latest advertisement content corresponding to an advertisement content recorded on the Blu-ray disc to be downloaded from any of the CM providing servers 4 to 6.

Therefore, the CPU 21 of the control unit 20 is configured to be able to download the latest advertisement content and others from a relevant site at any time according to the BD-J application. At download, the latest advertisement content can be stored in the USB memory 10 via a USB interface 29.

1-3. Structure of the Functional Block to Obtain Personal Content and Advertisement Content Next, functional blocks for the CPU 21 of the control unit 20 to obtain a personal content and an advertisement content to be recorded on the disk-shaped recording medium 7 according to the application program are described with reference to FIG. 3.

That is, a data format processing unit 41, a personal content analyzing unit 42, a CM providing server selecting unit 43, a thumbnail image generating unit 44, and a menu screen generating unit 45 are all software functional blocks generated by the CPU 21 of the control unit 20 according to the application program.

The data format processing unit 41 performs format conversion on a personal content D1 captured from the digital video camera 8, according to a medium type, because the data format is varied depending on whether the disk-shaped recording medium 7 for recording is a Blu-ray disc or a DVD.

The data format processing unit 41 sends a personal content D1A obtained by format conversion to the personal content analyzing unit 42, the thumbnail image generating unit 44, and a personal content database 26A constructed in the hard disk drive 26.

The personal content analyzing unit 42 is configured to analyze the personal content D1A by a predetermined method to generate meta data D1B, and send the meta data D1B to the CM providing server selecting unit 43.

The personal content analyzing unit 42 is configured to perform, for example, thesaurus analysis, on the personal content D1A to extract titles, a synonym, a quasi-synonym, a related term, a broad term, a narrow term, and other terms regarding the personal content D1A and generate the titles and the terms as the meta data D1B.

The personal content analyzing unit 42 is configured to perform, for example, atmosphere analysis, on the personal content D1A to calculate an interval between audio levels and an interval between silent parts, extract an audio-level changing pattern for each title, and generate the pattern as the meta data D1B.

Furthermore, even when the meta data D1B is not generated through thesaurus analysis or atmosphere analysis, the personal content analyzing unit 42 is configured to typically generate attribute information (for example, a recording date and time, data length, and shooting place) of the personal content D1A as the meta data D1B.

As described above, the personal content analyzing unit 42 sends to the CM providing server selecting unit 43 the meta data D1B formed of any of the titles and terms regarding the personal content D1A obtained through thesaurus, the audio-level changing pattern for each title, and the recording date and time, data length, shooting place of the personal content D1A.

When the meta data D1B includes the titles and terms regarding the personal content D1A obtained through thesaurus, the CM providing server selecting unit 43 selects the CM providing server 4 as a server from which an advertisement content is to be obtained, and transmits the meta data D1B to the CM providing server 4.

When the meta data D1B includes the audio-level changing pattern for each title obtained through atmosphere analysis, the CM providing server selecting unit 43 selects the CM providing server 5 as a server from which an advertisement content is to be obtained, and transmits the meta data D1B to the CM providing server 5.

Furthermore, when the meta data D1B includes only the attribution information of the personal content D1A, such as a recording date and time, data length, and shooting place, the CM providing server selecting unit 43 selects the CM providing server 6 as a server from which an advertisement content is to be obtained, and transmits the meta data D1B to the CM providing server 6.

As such, the CM providing server selecting unit 43 is configured to select any of the CM providing servers 4 to 6 assumed to be most suitable for the details of the meta data D1B and transmit the meta data D1B to the selected CM providing servers 4 to 6, thereby obtaining an advertisement content assumed to be most suitable for the details of the meta data D1B from the selected CM providing servers 4 to 6.

With this, the control unit 20 is configured to receive an advertisement content PC1 most related to the details of the meta data D1B from any of the CM providing servers 4 to 6 via a network interface 28 and store the advertisement content PC1 in an advertisement content database 26C constructed in a hard disk drive 26.

The thumbnail image generating unit 44 uses a first frame image in the personal content D1A supplied from the data format processing unit 41 to generate a thumbnail image SG1, having a predetermined size, to be placed at a predetermined position in a frame, which will be described further below.

The thumbnail image generating unit 44 stores the thumbnail image SG1 and the personal content D1A in the personal content database 26A in the hard disk drive 26 so that the thumbnail image SG1 and the personal content D1A are associated with each other, and also sends the thumbnail image SG1 to the menu screen generating unit 45.

Note that, similarly, the control unit 20 is configured to sequentially capture next personal contents D2 and D3 from the digital video camera 8 and perform the process described above also on the personal contents D2 and D3.

With this, the control unit 20 is configured to receive, from any of the CM providing servers 4 to 6, any of the advertisement contents PC2, PC3, . . . most related to the details of the metadata D2B and D3B via the network interface and store the received contents in the advertisement content database 26C constructed in the hard disk drive 26.

Here, the advertisement content PC1 is most related to the details of the meta data D1B, the advertisement content PC2 is most related to the details of the meta data D2B, and the advertisement content PC3 is most related to the details of the meta data D3B, but this is not a limitation.

For example, the advertisement contents PC1 and PC2 can be most related to the details of the meta data D1B, advertisement contents PC3, PC4, and PC5 can be most related to the details of the meta data D2B, and advertisement contents PC6 and PC7 can be most related to the details of the meta data D3B, and these contents can be all obtained in some cases.

Then, upon recognizing an instruction, from the remote controller 19, for recording the personal contents D1A, D2A, and D3A captured from the digital video camera 8 on the disk-shaped recording medium 7, the menu screen generating unit 45 performs the next process.

The menu screen generating unit 45 reads the personal contents D1A, D2A, and D3A from the personal content database 26A, and reads the advertisement contents PC1, PC2, PC3, . . . from the advertisement content database 26C, in response to the recording instruction.

Then, for the personal contents D1A, D2A, and D3A and the advertisement contents PC1, PC2, PC3, . . . , the menu screen generating unit 45 generates a menu screen (which will be described further below) to be initially displayed when the disk-shaped recording medium 7 is replayed later.

Therefore, the menu screen generating unit 45 is configured to obtain, for example, frames of various designs, when a menu screen is generated from a menu screen layout data database 26B constructed in the hard disk drive 26.

At this time, the menu screen generating unit 45 obtains the advertisement contents PC1, PC2, PC3, . . . from the advertisement content database 26C constructed in the hard disk drive 26, and uses an initial frame image in each of the advertisement contents PC1, PC2, PC3, . . . to generate advertisement thumbnail images PSG1, PSG2, PSG3, . . . (not shown) each having a predetermined size for placement in a predetermine position in the frame.

Then, the menu screen generating unit 45 places the thumbnail images SG1, SG2, and SG3 and the advertisement thumbnail images PSG1, PSG2, PSG3, . . . supplied from the thumbnail image generating unit 44 in the frame obtained from the menu screen layout data database 26B.

Figure 4A:
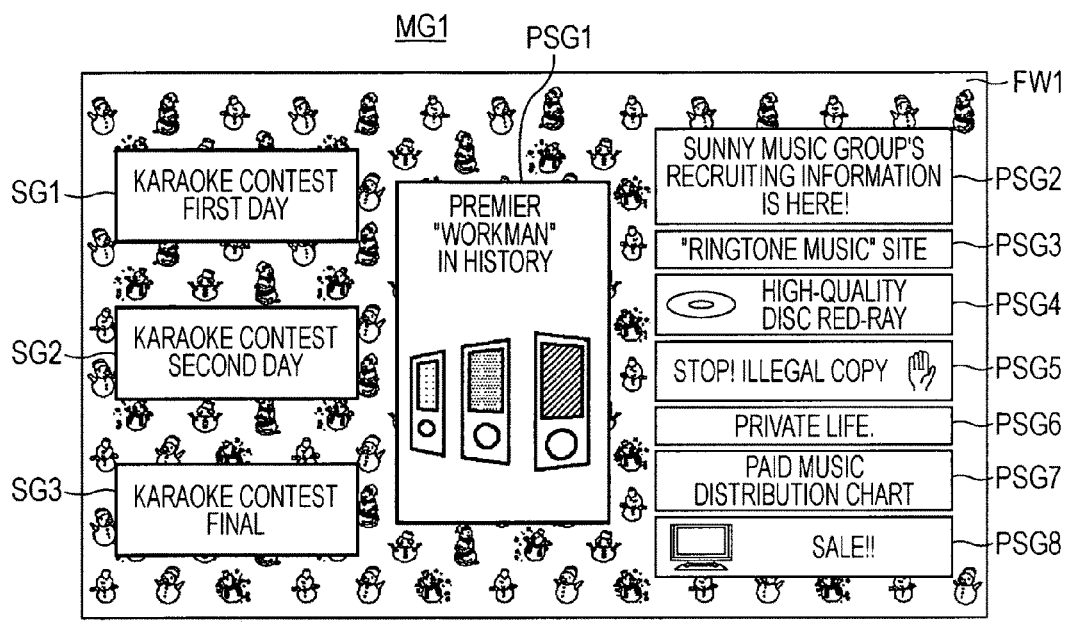
FIG. 4A schematically illustrates the layout of a menu screen for Blu-ray disc.
Figure 4B:
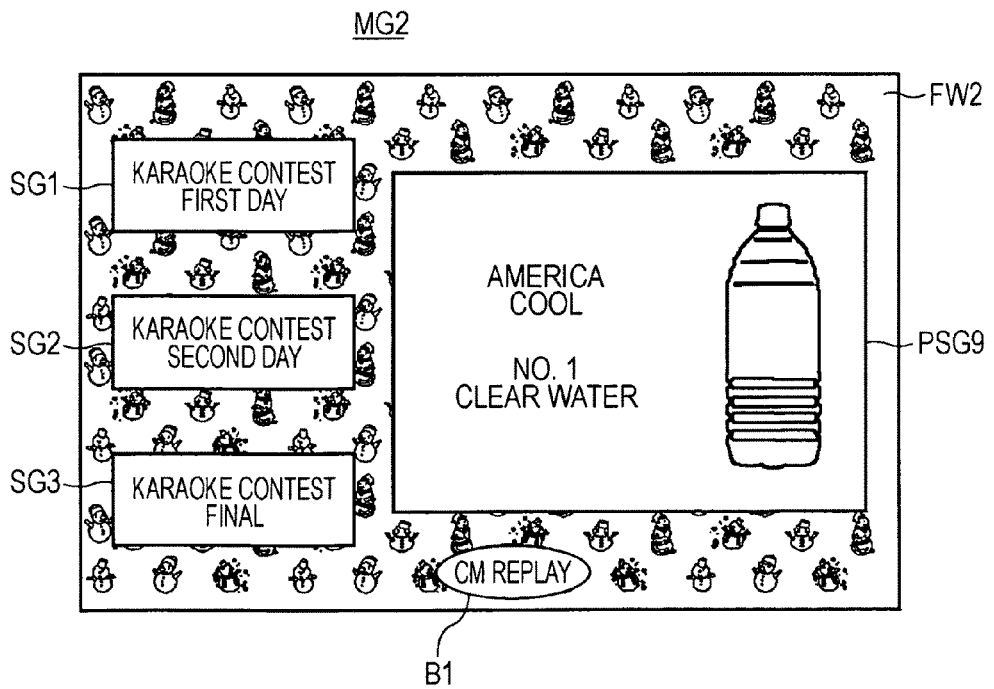
FIG. 4B schematically illustrates the layout of a menu screen for DVD.

With this, as depicted in FIGS. 4A and 4B, the menu screen generating unit 45 is configured to generate a menu screen MG1 or MG2 to be initially displayed when the disk-shaped recording medium 7 is replayed.

The menu screen MG1 or MG2 is configured to be written on the disk-shaped recording medium 7 together with the advertisement contents PC1, PC2, PC3, . . . and the personal contents D1A, D2A, and D3A.

The menu screen MG1 depicted in FIG. 4A is generated when the disk-shaped recording medium 7 is a Blu-ray disc, and a frame FW1 with a screen layout for the BD-Live function by the BD-J application is used.

That is, in the menu screen MG1, thumbnail images SG1, SG2, and SG3 corresponding to the personal contents D1, D2, and D3, respectively, are placed in three free areas provided on the left of the frame FW1, the advertisement thumbnail image PSG1 is placed in a center free area, and advertisement thumbnail images PSG2 to PSG8 are placed in seven free areas provided on the right of the frame FW1.

The menu screen MG2 depicted in FIG. 4B is generated when the disk-shaped recording medium 7 is a DVD. The thumbnail images SG1, SG2, and SG3 corresponding to the personal contents D1, D2, and D3, respectively, are placed in three free areas provided on the left of the frame FW2, and an advertisement thumbnail image PSG9 is placed in a free area provided on the right of the frame FW2.

As for the menu screen MG2, the frame FW2 is provided with a CM replay button B1 below the advertisement thumbnail image PSG9. When the CM replay button B1 is pressed, the control unit 20 is configured to cause, for example, the advertisement content PC3, corresponding to the advertisement thumbnail image PSG9, to be replayed for display on the television set 9.

Finally, with an instruction for recording the personal contents D1A, D2A, and D3A on the disk-shaped recording medium 7 as a trigger, the menu screen generating unit 45 is also configured to write the frames FW1 or FW2 on the disk-shaped recording medium 7 together with the advertisement contents PC1, PC2, PC3, . . . and the personal contents D1A, D2A, and D3A.

1-4. Circuit Structure of the CM Providing Server

Next, the circuit structure of the CM providing servers 4 to 6 is described. Since the CM providing servers 4 to 6 each have the same circuit structure, only the circuit structure of the CM providing server 4 is described for convenience.

Figure 5:
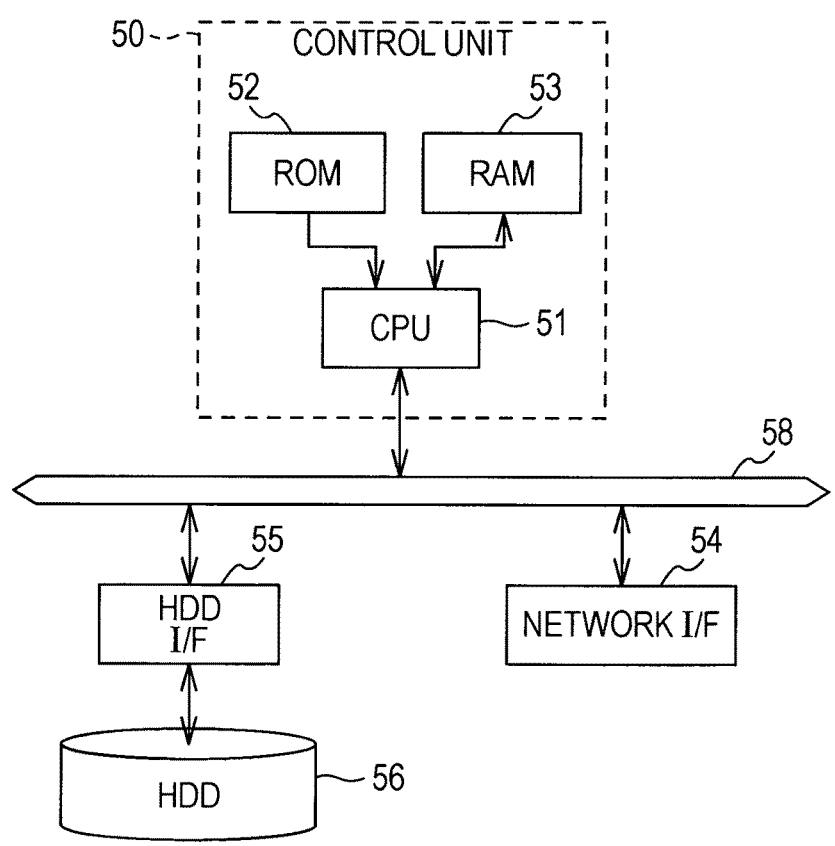
FIG. 5 is a schematic block diagram showing the circuit structure of a CM providing server.

As depicted in FIG. 5, in the CM providing server 4, a control unit 50 connected to a system bus 58 includes a CPU 51, a ROM 52, and a RAM 53. According to the basic program and others read from the ROM 52 and launched onto the RAM 53, an advertisement content is transmitted, for example.

In practice, based on the meta data D1B received from the BD recorder 2 via a network interface 54, the CPU 51 of the control unit 50 reads the most-related advertisement content PC1 from a hard disk drive 56 via a hard disk interface 55, and transmits the read advertisement content PC1 to the BD recorder 2 via the network interface 54.

Similarly, based on the meta data D2B and D3B received from the BD recorder 2 via the network interface 54, the CPU 51 of the control unit 50 reads the most-related advertisement contents PC2, PC3, . . . from the hard disk drive via the hard disk interface 55, and transmits the read advertisement contents PC2, PC3, . . . to the BD recorder 2 via the network interface 54.

1-5. Personal Content and Advertisement Content Recording Procedure

Next, a recording procedure is described in detail, the procedure of recording the personal contents D1A, D2A, and D3A and the advertisement contents PC1, PC2, PC3, . . . on the disk-shaped recording medium 7 in response to an instruction from the remote controller 19 for recording the personal contents D1, D2, and D3 captured from the digital video camera 8 on the disk-shaped recording medium 7.

Figure 6:
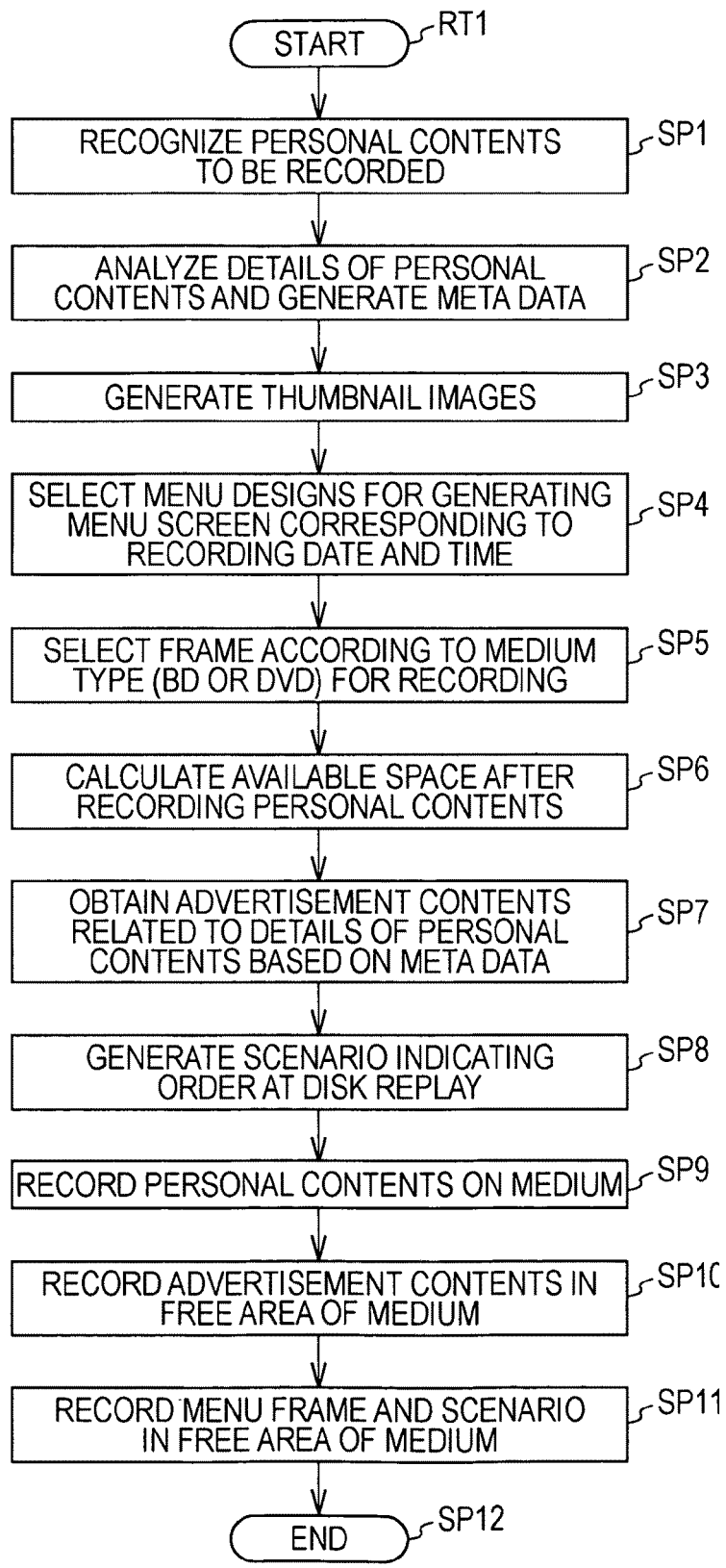
FIG. 6 is a flowchart of a personal-content, and advertisement-content recording procedure.

The control unit 20 of the BD recorder 2 enters a start step of a routine RT1, and then goes to the next step SP1, in FIG. 6.

At step SP1, the control unit 20 recognizes the personal contents D1, D2, and D3 to be recorded in the disk-shaped recording medium 7 selected by a user, and then goes to the next step SP2.

At step SP2, the control unit 20 analyzes the details of the personal contents D1, D2, and D3 to generate the meta data D1B, D2B, and D3B, and then goes to the next step SP3.

At step SP3, the control unit 20 generates the thumbnail images SG1, SG2, and SG3 based on initial frame images in the personal contents D1, D2, and D3, and then goes to the next step SP4.

At step SP4, the control unit 20 refers to the recording date and time based on the meta data D1B, D2B, and D3B, selects a menu design for generating the menu screen MG1 or MG2 corresponding to the recording date and time, and then goes to the next step SP5.

Figure 7A:
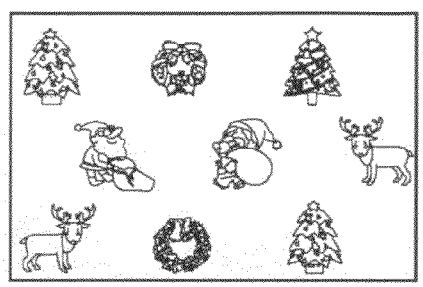
FIGS. 7A to 7D schematically illustrate menu design types.

For example, when the recording date and time of the meta data D1B, D2B, and D3B indicates "December", the control unit 20 selects a menu design (for use as a background image of the frame FW1 or FW2) presenting an image of "Christmas" as depicted in FIG. 7A.

Figure 7B:
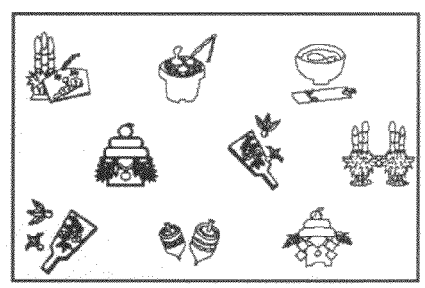

Also, for example, when the recording date and time of the meta data D1B, D2B, and D3B indicates "January", the control unit 20 selects a menu design presenting an image of "New Year" as depicted in FIG. 7B.

Figure 7C:
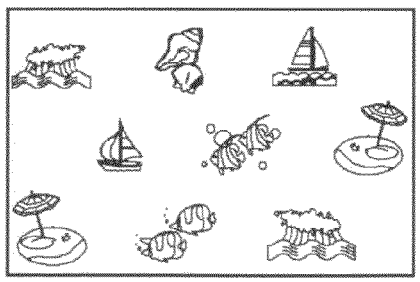
Figure 7D:
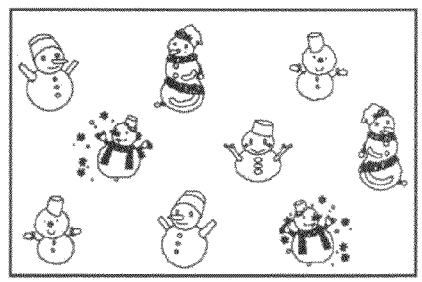

Similarly, for example, when the recording date and time of the meta data D1B, D2B, and D3B indicates "July and August", the control unit 20 selects a menu design presenting an image of "ocean" as depicted in FIG. 7C. Further, for example, when the recording date and time of the meta data D1B, D2B, and D3B indicates "February", the control unit 20 selects a menu design presenting an image of "snow" as depicted in FIG. 7D.

At step SP5, the control unit 20 selects the frame FW1 or FW2 for generating the menu screen MG1 or MG2 according to whether the medium type of the disk-shaped recording medium 7 is a Blu-ray disc or a DVD, and then goes to the next step SP6.

As depicted in FIG. 4A, when the medium type of the disk-shaped recording medium 7 is a Blu-ray disc, the control unit 20 selects the frame FW1 for generating the menu screen MG1. As depicted in FIG. 4B, when the medium type is a DVD, the control unit 20 selects the frame FW2 for generating the menu screen MG2.

With this, the control unit 20 can determine background images of the frame FW1 or FW2 for use on the menu screen MG1 or MG2.

At step SP6, the control unit 20 calculates, through computation, an available space after the personal contents D1, D2, and D3 are all recorded on the disk-shaped recording medium 7, and then goes to the next step SP7.

At step SP7, the control unit 20 transmits the meta data D1B, D2B, and D3B to any of the CM providing servers 4 to 6 according to the details of the meta data D1B, D2B, and D3B to obtain the advertisement contents PC1, PC2, PC3, . . . most related to the meta data D1B, D2B, and D3B from the relevant CM providing servers 4 to 6, and then goes to the next step SP8.

At step SP8, after recording the personal contents D1, D2, and D3 and the advertisement contents PC1, PC2, PC3, . . . on the disk-shaped recording medium 7, when a replay instruction is provided via the menu screen MG1 or MG2, the control unit 20 generates a scenario indicative of the order of replaying the contents in response to an instruction from the user, and then goes to the next step SP9.

Figure 8A:
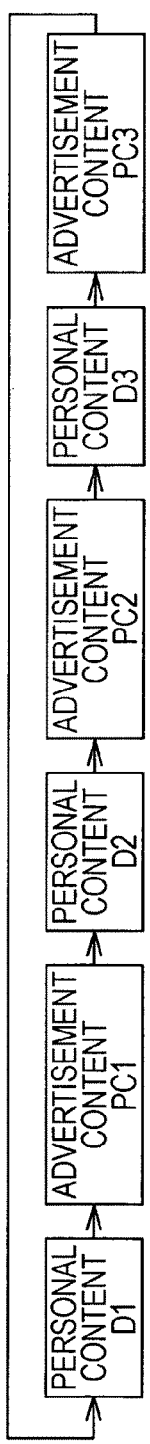
FIGS. 8A to 8D each schematically illustrate a scenario pattern.

As depicted in FIG. 8A, the control unit 20 can generate, for example, a scenario in a replay order in which the personal content D and the advertisement content PC are alternately arranged, such as in an order of the personal content D1, the advertisement content PC1, the personal content D2, the advertisement content PC2, the personal content D3, and then the advertisement content PC3.

Figure 8B:
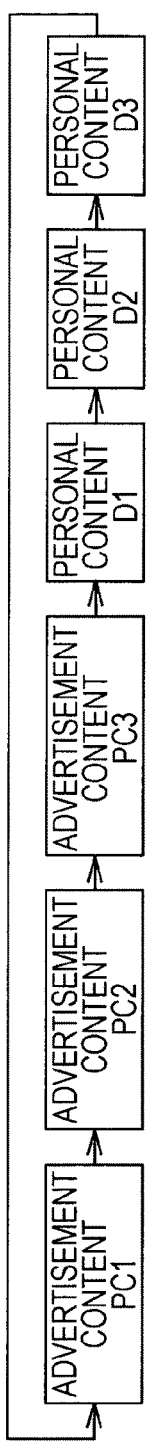

Also, as depicted in FIG. 8B, the control unit 20 can generate, for example, a scenario in a replay order in which the personal contents D are replayed after all of the advertisement contents PC are replayed, such as in an order of the advertisement content PC1, the advertisement content PC2, the advertisement content PC3, the personal content D1, the personal content D2, and then the personal content D3.

Figure 8C:

As depicted in FIG. 8C, the control unit 20 can generate, for example, a scenario in a replay order in which the advertisement contents PC are replayed after all of the personal contents D are replayed, such as in an order of the personal content D1, the personal content D2, the personal content D3, the advertisement content PC1, the advertisement content PC2, and then the advertisement content PC3.

Figure 8D:
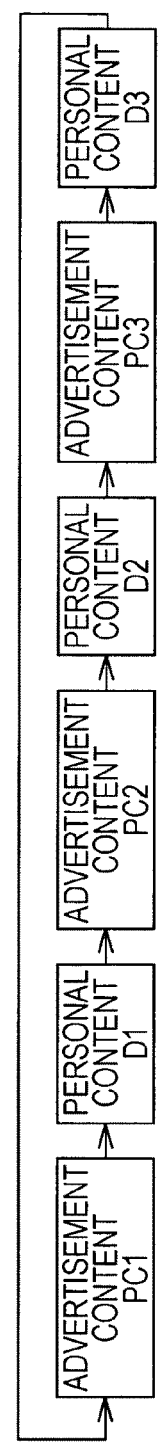

As depicted in FIG. 8D, the control unit 20 can generate, for example, a scenario in a replay order in which the advertisement content PC and the personal content D are alternately arranged, such as in an order of the advertisement content PC1, the personal content D1, the advertisement content PC2, the personal content D2, the advertisement content PC3, and then the personal content D3.

Figure 9:
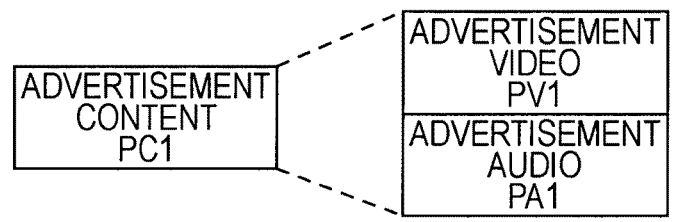
FIG. 9 illustrates the structure of an advertisement content.

For example, as depicted in FIG. 9, the advertisement content PC1 is configured of an advertisement video PV1 and an advertisement audio PA1 in an integrated manner.

At step SP9, the control unit 20 records the personal content D1, the personal content D2, and the personal content D3 on the disk-shaped recording medium 7, and then goes to the next step SP10.

At step SP10, the control unit 20 records the advertisement content PC1, the advertisement content PC2, the advertisement content PC3, and others in the free area after recording the personal content D1, the personal content D2, and the personal content D3 on the disk-shaped recording medium 7, and then goes to the next step SP11.

At step SP11, the control unit 20 records the frame FW1 or FW2 with the predetermined menu design selected at steps SP4 and SP5 and the scenario generated at step SP8 in the free area of the disk-shaped recording medium 7, and then goes to the next step SP12 to end the process.

1-6. Operation and Effect

In the above-described structure, the control unit of the BD recorder 2 in the recording system 1 automatically generates the meta data D1B, D2B, and D3B of the personal contents D1, D2, and D3 when recording the personal contents D1, D2, and D3 captured from the digital video camera 8 on the disk-shaped recording medium 7.

Then, the control unit 20 of the BD recorder 2 transmits each of the meta data D1B, D2B, and D3B to the relevant one of the CM providing servers 4 to 6 selected according to the details of each of the meta data D1B, D2B, and D3B, and obtains from the relevant CM providing servers 4 to 6 the advertisement contents PC1, PC2, PC3, . . . that are the latest at this moment and are most related to the details of the meta data D1B, D2B, and D3B.

Then, after writing the personal contents D1, D2, and D3 on the disk-shaped recording medium 7, the control unit 20 of the BD recorder 2 writes the advertisement contents PC1, PC2, PC3, . . . , the frame FW1 or FW2 forming the menu screen MG1 or MG2, and the scenario for use at replay in the available space of the disk-shaped recording medium 7.

With this, the control unit 20 of the BD recorder 2 can include the advertisement contents PC1, PC2, PC3, . . . assumed to interest users on the disk-shaped recording medium 7 together with the personal contents D1, D2, and D3. Therefore, the advertisement contents PC1, PC2, PC3, . . . meaningful to the users can be provided at the time of replaying the disk-shaped recording medium 7, thereby improving advertising effectiveness.

The control unit 20 of the BD recorder 2 can provide the advertisement contents PC1, PC2, PC3, . . . at the time of replaying the disk-shaped recording medium 7. Therefore, the user can intuitively know the time background of the personal contents D1, D2, and D3.

When the disk-shaped recording medium 7 is a Blu-ray disc, the control unit 20 of the BD recorder 2 can download not only the previously-recorded advertisement contents PC1, PC2, PC3, . . . but also the latest advertisement contents PC1, PC2, PC3, . . . from the CM providing servers 4 to 6 by using the BD-Live function and provide the downloaded advertisement contents PC1, PC2, PC3, . . . via the USB memory 10.

At this time, the CM providing servers 4 to 6 can obtain the number of times the advertisement contents PC1, PC2, PC3, . . . were downloaded to the BD recorder 2. Therefore, the actual advertising effectiveness can also be accurately reported to an advertiser side.

In the recording system 1, the control unit 20 of the BD recorder 2 can automatically record the advertisement contents PC1, PC2, PC3, . . . related to the personal contents D1, D2, and D3 on the disk-shaped recording medium 7 together with the personal contents D1, D2, and D3. Therefore, the retail price of hardware and the retail price of the disk-shaped recording medium 7 can be decreased by reflecting an advertisement income to be obtained by the manufacturer of the BD recorder 2.

According to the above-described structure, when recording the user's personal contents D1, D2, and D3 on the disk-shaped recording medium 7, the BD recorder 2 in the recording system 1 can automatically obtain the advertisement contents PC1, PC2, PC3, . . . related to the personal contents D1, D2, and D3 to record the obtained advertisement contents PC1, PC2, PC3, . . . in the available space of the disk-shaped recording medium 7.

With this, the BD recorder 2 of the recording system 1 can automatically generate the disk-shaped recording medium on which the personal contents D1, D2, and D3 and the advertisement contents PC1, PC2, PC3, . . . related to the personal contents D1, D2, and D3 are recorded.

2. Another Embodiment

In the above-described embodiment, the case is described in which the BD recorder 2 selects any of the CM providing servers 4 to 6 according to the meta data D1B, D2B, and D3B, and then downloads any of the advertisement contents PC1, PC2, PC3, . . . suitable for the personal contents D1, D2, and D3 from the selected CM providing servers 4 to 6.

Figure 10:
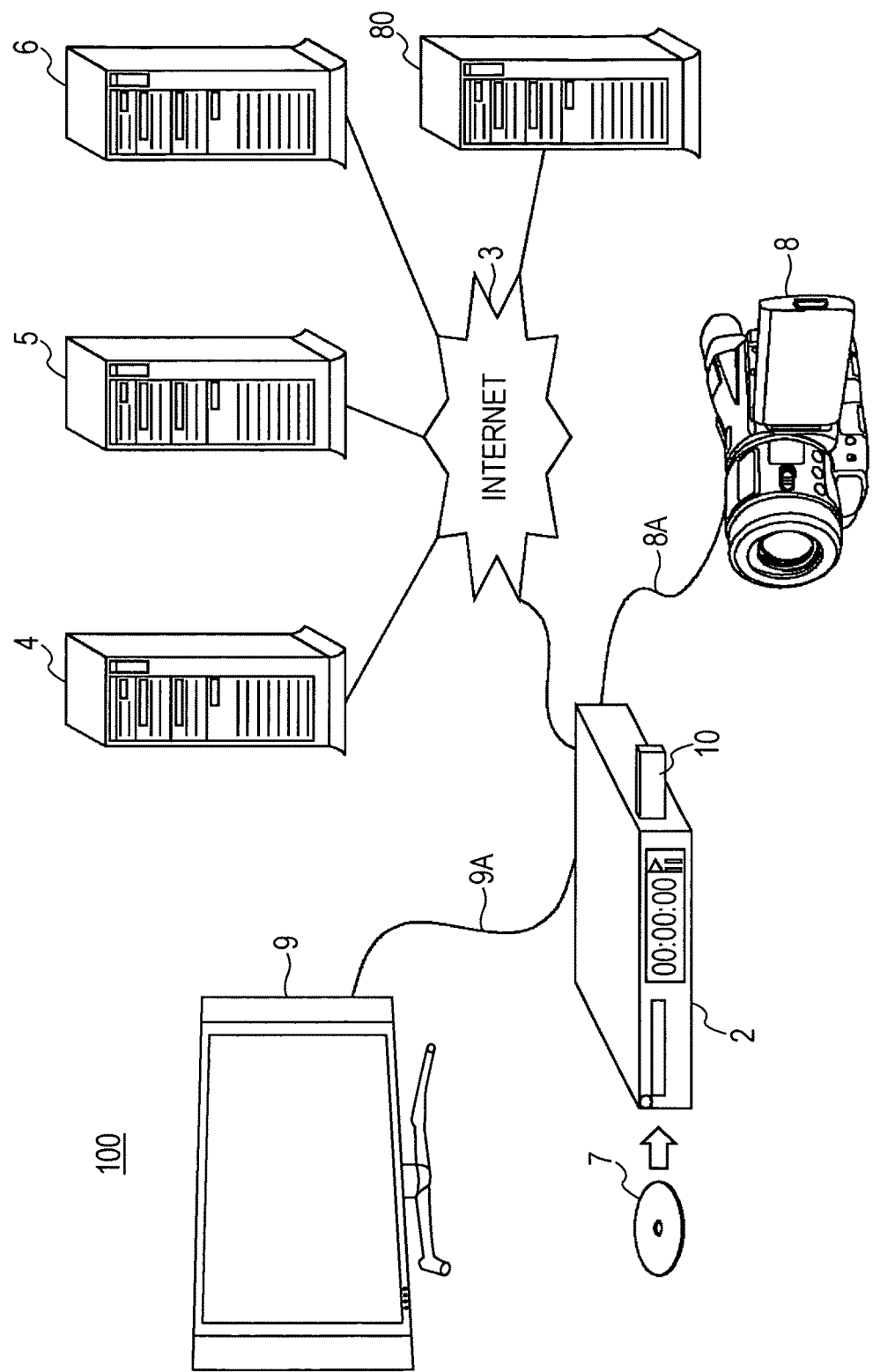
FIG. 10 is a schematic perspective view of the entire structure of a recording system according to another embodiment.

However, the embodiment of the present invention is not restricted to the above case. As depicted in FIG. 10 with the same reference characters provided to portions corresponding to those in FIG. 1, a dedicated CM obtaining server 80 may be provided. In this case, the CM obtaining server 80 can be achieved by having the basic structure as the CM providing server 4 but by having a function equivalent to that of the CM providing server selecting unit 43 (FIG. 3) of the BD recorder 2.

In practice, the CM obtaining server 80 can receive the meta data D1B, D2B, and D3B from the BD recorder 2, can search for any of the CM providing servers 4 to 6 that provides any suitable advertisement contents PC1, PC2, PC3, . . . based on the meta data D1B, D2B, and D3B, can transmit the meta data D1B, D2B, and D3B to the relevant CM providing servers 4 to 6, and can transfer the advertisement contents PC1, PC2, PC3, . . . received from the relevant CM providing servers 4 to 6 to the BD recorder 2.

Also, in the above-described embodiment, the case is described in which the control unit 20 of the BD recorder 2 replays the advertisement contents PC1, PC2, PC3, . . . suitable for the personal contents D1, D2, and D3 according to the scenario depicted in any of FIGS. 8A to 8D.

Figure 11:
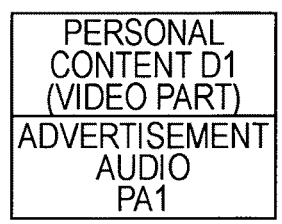
FIG. 11 schematically illustrates a scenario pattern (1) in which a personal content and advertisement audio are combined together, according to still another embodiment.

However, the embodiment of the present invention is not restricted to the above case. According to a scenario patter (1) depicted in FIG. 11, the control unit 20 of the BD recorder 2 may replay and output, for example, a video part of the personal content D1 and an advertisement audio PA1 of the advertisement content PC1 in combination.

In this case, the control unit 20 of the BD recorder 2 can provide a new content, the content matching the video of the personal content D1 created by the user himself or herself with the advertisement audio PA1 in corporate advertising.

With this, the control unit 20 of the BD recorder 2 can let the user view a new content as if the video of the personal content D1 created by the user himself or herself were used in corporate CM video, thereby providing entertainment.

Furthermore, in the above-described embodiment, the case is described in which the control unit 20 of the BD recorder 2 replays the advertisement contents PC1, PC2, PC3, . . . suitable for the personal contents D1, D2, and D3 according to the scenario depicted in any of FIGS. 8A to 8D.

Figure 12:
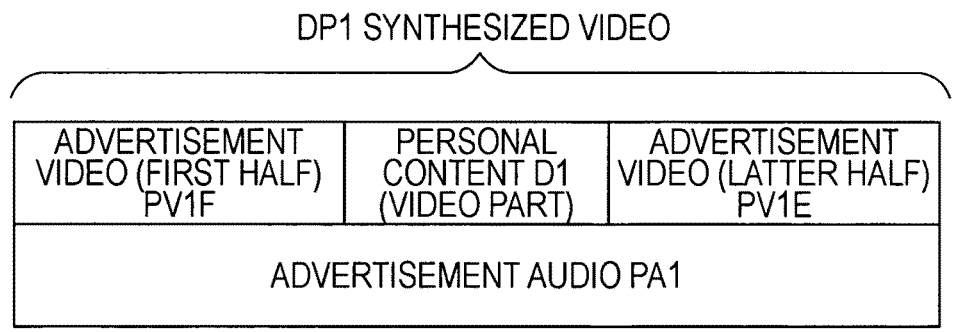
FIG. 12 schematically illustrates a scenario pattern (2) in which a personal content, advertisement video, and advertisement audio are combined together, according to yet another embodiment.

However, the embodiment of the present invention is not restricted to the above case. According to a scenario pattern (2) depicted in FIG. 12, the control unit 20 of the BD recorder 2 may replay and output a synthesized video DP1 combining a first half of advertisement video, PV1F, in the advertisement content PC1, a video part of the personal content D1, and a latter half of the advertisement video, PV1E, in the advertisement content PC1, together and the advertisement audio PA1 of the advertisement content PC1 in combination.

In this case, with the video part of the personal content D1 created by the user himself or herself being interposed between the corporate advertisement video PV1F (for example, video of the name and logo of a product) and the advertisement video PV1E (video of a corporate brand name), the control unit 20 of the BD recorder 2 can provide a new content, the content matching with the advertisement audio PA1 in corporate advertising.

With this, the control unit 20 of the BD recorder 2 can let the user view a new content as if the video of the personal content D1 created by the user himself or herself were used in corporate CM video, thereby providing entertainment.

Based on the meta data D1B used when obtaining the advertisement content PC1, the control unit 20 of the BD recorder 2 searches for the personal content D1 that serves as a source for generating the meta data D1B and specifies a start time and an end time, thereby extracting the video part of the personal content D1 to be combined with the advertisement content PC1 for use.

In the above-described embodiment, the case is described in which the control unit 20 of the BD recorder 2 replays the advertisement contents PC1, PC2, PC3, . . . suitable for the personal contents D1, D2, and D3 according to the scenario depicted in any of FIGS. 8A to 8D.

However, the embodiment of the present invention is not restricted to the above case. The menu screen MG1 may be provided with an advertisement button (not shown) for collectively viewing only the plurality of these advertisement contents PC1, PC2, PC3, . . . and, when the advertisement button is pressed, only the plurality of these advertisement contents PC1, PC2, PC3, . . . may be collectively replayed and output.

Figure 13:
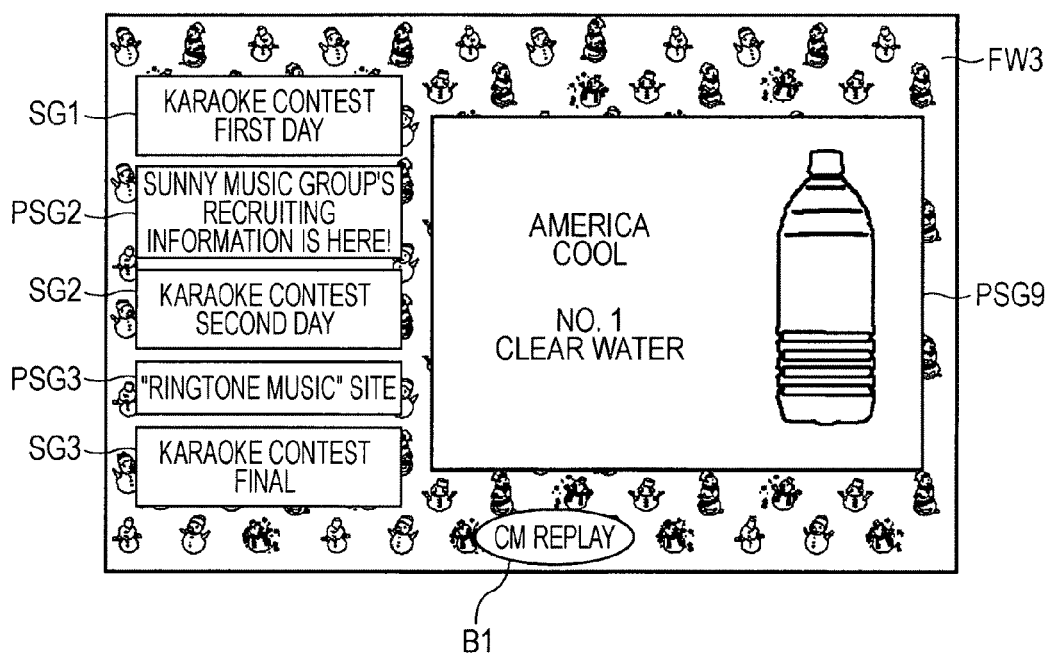
FIG. 13 schematically illustrates the layout of a menu screen for DVD according to yet another embodiment.

In the above-described embodiment, the case is described in which the frame FW2 of the menu screen MG2 as depicted in FIG. 4B is used. However, the embodiment of the present invention is not restricted to the above case. As depicted in FIG. 13, the control unit 20 of the BD recorder 2 may use a frame FW3 of a menu screen MG2Z in which the advertisement thumbnail images PSG2 and PSG3 of the advertisement contents PC1 and PC2 are displayed among the thumbnail images SG1, SG2, and SG3 of the personal contents D1, D2, and D3.

In this case, when the disk-shaped recording medium 7 is a DVD, with a program chain, the control unit 20 of the BD recorder 2 can replay and output the personal content D1, the advertisement content PC1, the personal content D2, the advertisement content PC2, and the personal content D3 in an order of the thumbnail image SG1, the advertisement thumbnail image PSG2, the thumbnail image SG2, the advertisement thumbnail image PSG3, and then the thumbnail image SG3 arranged on the menu screen MG2Z.

In the above-described embodiment, the case is described in which the digital video camera 8 is used as an electronic device that creates the personal contents D1, D2, and D3. However, the embodiment of the present invention is not restricted to the above case. A portable phone with a camera function, a notebook personal computer, a game machine, and other various electronic devices may be used.

In the above-described embodiment, the case is described in which the BD recorder 2 is used for recording a personal content on the disk-shaped recording medium 7. However, the embodiment of the present invention is not restricted to the above case. A television set with a recording function, a personal computer, and other various electronic devices may be used.

In the above-described embodiment, the case is described in which the BD recorder 2 as the information processing apparatus according to the embodiment of the present invention is configured of the control unit 20 as a recording section, and the disk recording/replaying unit 24, the personal content analyzing unit 42 as a meta data generator, the control unit 20 as an advertisement content obtaining section, the CM providing server selecting unit 43, the control unit 20 as a controller, and the disk recording/replaying unit 24.

However, the embodiment of the present invention is not restricted to the above case. An information processing apparatus according to another embodiment of the present invention may be configured of a recording section, a meta data generator, an advertisement content obtaining section, and a controller having various other structures.

In the above-described embodiment, the case is described in which each of the CM providing servers 4 to 6 as an advertisement content providing server according to the embodiment of the present embodiment includes the hard disk drive 56 as an advertisement content storage section, the control unit 50 as an advertisement content searching section, and the control unit 50 as a transmitter, and the network interface 54.

However, the embodiment of the present invention is not restricted to the above case. An advertisement content providing server according to another embodiment of the present invention may be configured of an advertisement content storage section, an advertisement content searching section, and a transmitter having various other structures.

In the above-described embodiment, the case is described in which the CM obtaining server 80 (FIG. 10) as the advertisement content obtaining server according to the embodiment of the present invention includes the control unit as an advertisement content providing server searching section, the control unit 50 as an advertisement content obtaining section, and the network interface 54.

However, the embodiment of the present invention is not restricted to the above case. An advertisement content obtaining server according to another embodiment of the present invention may include an advertisement content providing server searching section and an advertisement content obtaining section having various other structures.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   recording means for recording a personal content created by an individual on a predetermined recording medium;
   meta data generating means for generating meta data for the personal content by analyzing details of the personal content;
   advertisement content obtaining means for obtaining an advertisement content corresponding to the meta data from an advertisement content providing server selected from among a number of advertisement content providing servers; and
   control means for causing the personal content and the advertisement content to be recorded on the recording medium via the recording means,
   in which the meta data generating means generates the meta data by use of a predetermined technique from among a number of predetermined techniques,
   in which one predetermined technique is atmosphere analysis in which an interval or intervals between audio levels and an interval or intervals between silent parts of the personal content are calculated so as to generate an audio-level changing pattern as the meta data, and
   in which the advertisement content obtaining means obtains the advertisement content from a respective advertisement content providing server which is selected from among the number of advertisement content providing servers based on the predetermined technique used by the meta data generating means to generate the meta data such that when a first predetermined technique is used by the meta data generating means to generate the meta data the advertisement content obtaining means obtains the advertisement content from a first advertisement content providing server and when a second predetermined technique is used by the meta data generating means to generate the meta data the advertisement content the advertisement content obtaining means obtains the advertisement content from a second advertisement content providing server.

2. The information processing apparatus according to claim 1, wherein the control means causes the advertisement content to be recorded according to an available space after the personal content is recorded on the recording medium.

3. The information processing apparatus according to claim 2, wherein, at the time of replaying the recording medium, the control means causes thumbnail images of both (i) the personal content and (ii) the advertisement content to be inserted in a frame of a predetermined design, and further causing the frame at the time of generating a menu screen to be recorded on the recording medium.

4. The information processing apparatus according to claim 3, wherein the control means further causes, in addition to the menu screen, a scenario to be recorded on the recording medium, the scenario being set in advance by a user for replaying the personal content and the advertisement content.

5. The information processing apparatus according to claim 4, wherein the control means causes the personal content and the advertisement content to be replayed according to the scenario for replaying video of the personal content and advertisement audio of the advertisement content in combination.

6. The information processing apparatus according to claim 1, wherein the control means causes a latest advertisement content of the advertisement content recorded on the recording medium to be downloaded from the respective advertisement content providing server.

7. An information processing apparatus comprising:
   recording means for recording a personal content created by an individual on a predetermined recording medium;
   meta data generating means for generating meta data for the personal content by analyzing details of the personal content;
   advertisement content obtaining means for obtaining an advertisement content corresponding to the meta data from a predetermined advertisement content providing server; and
   control means for causing the personal content and the advertisement content to be recorded on the recording medium via the recording means,
   wherein the control means causes the advertisement content to be recorded according to an available space after the personal content is recorded on the recording medium,
   wherein, at the time of replaying the recording medium, the control means causes thumbnail images of both (i) the personal content and (ii) the advertisement content to be inserted in a frame of a predetermined design, and further causing the frame at the time of generating a menu screen to be recorded on the recording medium,
   wherein the control means further causes, in addition to the menu screen, a scenario to be recorded on the recording medium, the scenario being set in advance by a user for replaying the personal content and the advertisement content, and
   wherein the control means causes the personal content and the advertisement content to be replayed according to the scenario for replaying a synthesized image and advertisement audio of the advertisement content in combination, the synthesized image in which a first half of advertisement video in the advertisement content, video of the personal content, and a latter half of the advertisement video in the advertisement content are synthesized together.

8. A recording method comprising the steps of:
generating meta data for a personal content created by an individual, the personal content to be recorded on a predetermined recording medium, by analyzing details of the personal content by meta data generating means;
obtaining by advertisement content obtaining means an advertisement content corresponding to the meta data from a predetermined advertisement content providing server; and
causing by control means the personal content and the advertisement content to be recorded on the recording medium via predetermined recording means,
and further comprising
causing by the control means a scenario to be recorded on the recording medium, the scenario being set in advance by a user for replaying the personal content and the advertisement content, and
causing by the control means the personal content and the advertisement content to be replayed according to the scenario for replaying a synthesized image and advertisement audio of the advertisement content in combination, the synthesized image in which a first half of advertisement video in the advertisement content, video of the personal content, and a latter half of the advertisement video in the advertisement content are synthesized together.

9. A recording system comprising:
an information processing apparatus including
a recording section recording a personal content created by an individual on a predetermined recording medium,
a meta data generator generating meta data for the personal content by analyzing details of the personal content,
an advertisement content obtaining section obtaining an advertisement content corresponding to the meta data from a predetermined advertisement content providing server, and
a controller causing the personal content and the advertisement content to be recorded on the recording medium via the recording section; and
an advertisement content providing server including
an advertisement content storage section having a plurality of the advertisement contents stored,
an advertisement content searching section receiving the meta data, searching for the advertisement content corresponding to the meta data, and reading the advertisement content from the advertisement content storage section, and
a transmitter transmitting the advertisement content to the information processing apparatus,
wherein the controller further causes a scenario to be recorded on the recording medium, the scenario being set in advance by a user for replaying the personal content and the advertisement content, and
wherein the control means causes the personal content and the advertisement content to be replayed according to the scenario for replaying a synthesized image and advertisement audio of the advertisement content in combination, the synthesized image in which a first half of advertisement video in the advertisement content, video of the personal content, and a latter half of the advertisement video in the advertisement content are synthesized together.

10. A recording system comprising:
an information processing apparatus including
a recording section recording a personal content created by an individual on a predetermined recording medium,
a meta data generating section generating meta data for the personal content by analyzing details of the personal content,
an advertisement content obtaining section obtaining an advertisement content corresponding to the meta data from a predetermined advertisement content providing server, and
a recording controller causing the personal content and the advertisement content to be recorded on the recording medium via the recording section;
an advertisement content providing server including
an advertisement content providing server searching section receiving the meta data and searching for the advertisement content providing server that retains the advertisement content corresponding to the meta data, and
an advertisement content obtaining section transmitting the meta data, receiving the advertisement content corresponding to the meta data from the advertisement content providing server, and transferring the advertisement content to the information processing apparatus; and
an advertisement content providing server including
an advertisement content storage section storing a plurality of the advertisement contents,
an advertisement content searching section receiving the meta data from the advertisement obtaining server, searching for the advertisement content corresponding to the meta data, and reading the advertisement content from the advertisement content storage section, and
a transmitter transmitting the advertisement content to the advertisement content providing server,
wherein the recording controller causes a scenario to be recorded on the recording medium, the scenario being set in advance by a user for replaying the personal content and the advertisement content, and
wherein the recording controller causes the personal content and the advertisement content to be replayed according to the scenario for replaying a synthesized image and advertisement audio of the advertisement content in combination, the synthesized image in which a first half of advertisement video in the advertisement content, video of the personal content, and a latter half of the advertisement video in the advertisement content are synthesized together.

* * * * *